(12) United States Patent
Hafvenstein

(10) Patent No.: US 10,562,505 B2
(45) Date of Patent: Feb. 18, 2020

(54) HYDRAULIC WARM-UP SYSTEM RUNNING OFF PARKING BRAKE

(71) Applicant: CNH Industrial America LLC, New Holland, PA (US)

(72) Inventor: David Hafvenstein, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/837,444

(22) Filed: Dec. 11, 2017

(65) Prior Publication Data

US 2019/0176788 A1 Jun. 13, 2019

(51) Int. Cl.
*B60T 13/18* (2006.01)
*B60R 16/08* (2006.01)
*B60T 15/36* (2006.01)

(52) U.S. Cl.
CPC .............. *B60T 13/18* (2013.01); *B60R 16/08* (2013.01); *B60T 15/36* (2013.01); *B60Y 2200/224* (2013.01)

(58) Field of Classification Search
CPC ......... B60T 13/18; B60T 15/36; B60R 16/08; B60Y 2200/224
See application file for complete search history.

(56) References Cited

U.S. PATENT DOCUMENTS

| 3,240,539 | A | * | 3/1966 | Schubert | B60T 13/265 303/29 |
| 4,059,042 | A | * | 11/1977 | Bridwell | B60T 13/18 91/31 |
| 4,070,858 | A | * | 1/1978 | Hand | F15B 13/022 137/101 |
| 4,253,540 | A | * | 3/1981 | Berg | B62D 5/09 180/420 |
| 5,984,425 | A | * | 11/1999 | Orzal | B60T 15/041 188/170 |
| 6,681,568 | B2 | * | 1/2004 | Smith | F01P 7/044 60/422 |
| 7,159,554 | B2 | * | 1/2007 | Catalano | B60H 1/00314 123/142.5 R |

(Continued)

FOREIGN PATENT DOCUMENTS

| FR | 2434928 A | 3/1980 |
| FR | 2942439 A | 8/2010 |
| WO | 2015041584 | 3/2015 |

*Primary Examiner* — Xuan Lan Nguyen
(74) *Attorney, Agent, or Firm* — Rebecca L. Henkel; Rickard K. DeMille

(57) ABSTRACT

An agricultural machine such as a high clearance sprayer is provided with a hydraulic warm-up system for warming multiple hydraulic circuits. The sprayer includes a parking brake system, a hydraulic system including a parking brake hydraulic circuit and at least one ancillary hydraulic circuit, and a hydraulic warm-up system. The warm-up system includes a warm-up circuit defined by the parking brake hydraulic circuit and the at least one ancillary hydraulic circuit so that oil flows through the parking brake hydraulic circuit into the at least one ancillary hydraulic circuit. As a result of this oil flow, the at least one ancillary hydraulic circuit is warmed to improve functionality of the ancillary hydraulic circuit. Where the parking brake is activated and the sprayer is stationary, oil may be diverted to the ancillary hydraulic circuit.

13 Claims, 2 Drawing Sheets

(56) References Cited

U.S. PATENT DOCUMENTS

| | | | | |
|---|---|---|---|---|
| 7,779,744 | B2* | 8/2010 | Wong | B60T 13/161 |
| | | | | 91/516 |
| 8,360,531 | B2* | 1/2013 | Gales | B60T 13/662 |
| | | | | 303/10 |
| 8,615,992 | B2* | 12/2013 | Naito | B60T 13/22 |
| | | | | 188/170 |
| 9,174,612 | B2 | 11/2015 | Ruona et al. | |
| 9,421,958 | B2* | 8/2016 | Dix | B60T 13/22 |
| 9,482,205 | B2 | 11/2016 | Tietze et al. | |
| 2006/0076427 | A1 | 4/2006 | Schneider, Jr. et al. | |
| 2016/0131009 | A1 | 5/2016 | Etchason | |

* cited by examiner

HYDRAULIC WARM-UP SYSTEM RUNNING OFF PARKING BRAKE

FIELD OF THE INVENTION

The invention relates generally to agricultural product application equipment or agricultural machines such as self-propelled sprayers and, in particular, to a hydraulic warm-up system that uses hydraulic oil associated with a parking brake to flush lines associated with other hydraulic functions to warm these lines to optimize use of the hydraulic functions by reducing their warmup time.

BACKGROUND OF THE INVENTION

Many kinds of mobile hydraulic equipment, such as agricultural sprayers, are parked outside overnight. On cold mornings, the equipment needs to warm up, and certain hydraulic functions may be sluggish until they have been operated several times and until the oil temperature has warmed up. This is particularly true of service brakes and implement hydraulic circuits, where the oil in the hydraulic lines and valves does not move or warm up until a command to operate them is given.

Additionally, it should be noted that agricultural sprayers and many other kinds of mobile hydraulic equipment use parking brakes that are released by pressurized hydraulic oil. While the equipment is parked, oil associated with releasing the parking brake is not used. Typically, the parking brake circuit contains a two-position, three-way valve that directs a small amount of flow from a constantly-pressurized hydraulic supply to the parking brakes when the operator wishes to release the brakes. The constantly-pressurized hydraulic supply is oftentimes delivered by a gear pump running over a low pressure relief. This hydraulic supply for the parking brakes usually just runs over a relief valve while the equipment is parked and idling, which is not an efficient use of the oil capacity.

SUMMARY OF THE INVENTION

A hydraulic warm-up system for us with a high clearance sprayer. According to an aspect of the invention, the hydraulic warm-up system may include a parking brake and a first hydraulic circuit associated with the parking brake. Additionally, the hydraulic warm-up system may include a hydraulic supply with pressurized hydraulic oil that includes a volume of parking brake oil defined by oil supplied from the hydraulic system to the parking brake, and a plurality of additional hydraulic circuits. The hydraulic supply may be a gear pump. Additionally, the hydraulic supply may maintain a constant pressure while the pressurized hydraulic oil moves about the high clearance sprayer to different systems that require hydraulic power.

According to another aspect of the invention, the hydraulic warm-up system may include a valve that is associated with the first hydraulic circuit and the plurality of additional hydraulic circuits. The valve may be a multi-position multi-way valve. For instance, the valve may be a two-position, four-way valve. They valve may be moved from a first position to a second position. In the first position, the supply of parking brake oil may be routed through the first hydraulic circuit to release the parking brake when the high clearance sprayer is mobile. In the second position, the supply of parking brake oil may be routed through the plurality of hydraulic circuits when the high clearance sprayer is parked. As such, the parking brake oil may be diverted away from the first hydraulic circuit when the high clearance sprayer is parked.

According to yet another aspect of the invention, the supply of pressurized hydraulic oil may initially be at a first temperature. The plurality of additional hydraulic circuits may initially be a second temperature, where the first temperature is higher than the second temperature. Thus, when the pressurized hydraulic oil is routed through the plurality of additional hydraulic circuits, the temperature of the plurality of additional hydraulic circuits is raised.

According to another aspect of the invention, the plurality of additional hydraulic circuits is supplied with oil when a component associated with the additional hydraulic circuits is actuated. For instance, the component could be a service brake. When the component is a service brake, the plurality of additional hydraulic circuits may include a second hydraulic circuit that is associated with the service brake. Additionally, the parking brake oil may be routed through the second hydraulic circuit when the high clearance sprayer is parked.

According to yet another aspect of the invention, the hydraulic warm-up system may further include an orifice. The orifice may be configured to limit warm-up flow of the oil. Similarly, the orifice may be configured to prevent the plurality of additional hydraulic circuits from exceeding a predetermined pressure. Further still, the orifice may be configured to relieve pressure about the plurality of additional hydraulic circuits. This is helpful to prevent activation of a component associated with the additional hydraulic circuits.

According to another aspect of the invention, an off-road agricultural vehicle is provided with multiple hydraulic circuits for performing multiple machine functions and a hydraulic warm-up system. This vehicle may include a parking brake system, a hydraulic system, and a hydraulic warm-up system. The brake system may include a parking brake that defines an activated state where rotation of wheels associated with the off-road agricultural vehicle is prevented. Additionally, the brake system may include a deactivated state where the rotations of the wheels of the off-road agricultural vehicle is allowed. The hydraulic system could include a parking brake hydraulic circuit and at least one ancillary hydraulic circuit. The parking brake hydraulic circuit directs flow of hydraulic oil through the parking brake system to control activating and deactivating the parking brake. Additionally, the at least one ancillary hydraulic circuit directs flow of hydraulic oil for correspondingly performing at least one ancillary function of the off-road agricultural vehicle. Further still, the hydraulic warm-up system may include a warm-up circuit defined by at least part of the parking brake hydraulic circuit and the at least one ancillary hydraulic circuit. This would allow for some of the hydraulic oil that flows through the parking brake hydraulic circuit to flow through the at least one ancillary hydraulic circuit when the parking brake is activated for warming the at least one ancillary hydraulic circuit.

According to yet another aspect of the invention, the parking brake hydraulic circuit may include a parking brake supply pump, a parking brake valve, and at least one parking brake circuit hydraulic line that fluidly connects the parking brake supply pump for delivering hydraulic oil through the parking brake hydraulic circuit. Additionally, the warm-up circuit may include at least one warm-up circuit hydraulic line that fluidly connects the parking brake hydraulic circuit to the warm-up circuit. Furthermore, when the parking brake is activated, at least some of the hydraulic oil flows out of the parking brake hydraulic circuit and through the warm-up circuit hydraulic line for delivery through the at least one ancillary hydraulic circuit.

According to another aspect of the invention, the at least one ancillary hydraulic circuit may be defined within a service brake system of the off-road agricultural vehicle. In this case, the at least one parking brake circuit hydraulic line and the at least one warm-up circuit hydraulic line is connected to the parking brake valve. Thereafter, at least some of the hydraulic oil flows from the at least one parking brake circuit hydraulic line through the parking brake valve and out of the at least one warm-up circuit hydraulic line for delivery through the service brake system to warm the service brake system.

According to another aspect, the system may include a parking brake control device that is movable between a first position and a second position once the parking brake is activated. When in the first position, the parking brake may be in a set position where the parking brake is activated. The control device may move to the second position where the parking brake is in a released position when the parking brake is deactivated. Furthermore, the parking brake control device may be defined by a rocker switch that can pivot between the parking brake set position and the parking brake released position.

According to yet another aspect of the invention, a hydraulic warm-up system for use with an off-road agricultural vehicle is provided. The hydraulic warm-up system may include a parking brake hydraulic circuit, an ancillary hydraulic circuit, and a warm-up circuit. The parking brake hydraulic circuit may continuously direct a flow of a hydraulic oil through a parking brake system to maintain a parking brake in an activated state to prevent rotation of wheels of the off-road agricultural vehicle once the parking brake is set. The parking brake hydraulic circuit may include a parking brake supply pump, a parking brake valve, and a parking brake circuit hydraulic line. The parking brake circuit hydraulic line may fluidly connect the parking brake supply pump for delivering hydraulic oil through the parking brake hydraulic circuit. Additionally, the ancillary hydraulic circuit may direct flow of hydraulic oil for performing an ancillary function of the off-road agricultural vehicle. Further still, the warm-up circuit may include a warm-up circuit hydraulic line that fluidly connects the parking brake valve to the ancillary hydraulic circuit. Further still, at least some of the hydraulic oil that flows through the parking brake hydraulic circuit is directed through and warms the ancillary hydraulic circuit.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
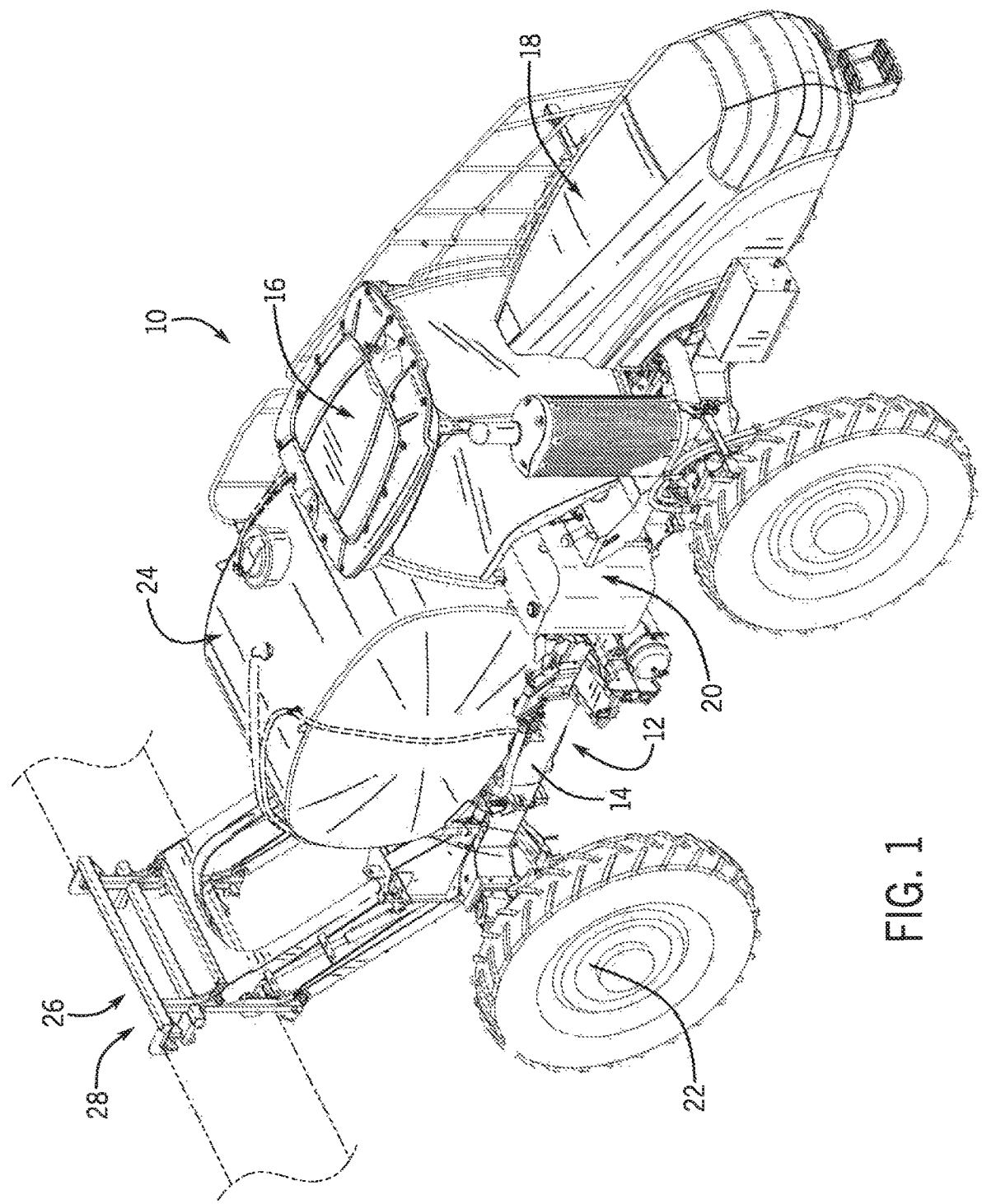
FIG. 1 is an isometric view of an agricultural machine with a hydraulic wane-up system.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10, shown here as a rear-boom sprayer, such as those available from CASE IH as the Trident™ Series Combination applicator and Patriot® Series sprayers. Although sprayer 10 is shown as a rear-boom self-propelled sprayer, it is understood that sprayer 10 can instead be configured as a front-boom sprayer, such as those available from CNH Industrial, including the Miller Nitro and New Holland Guardian Series front-boom sprayers.

Still referring to FIG. 1, the sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as a rinse tank for storing water and/or a rinsing solution and a product tank for storing a volume of product for delivery onto an agricultural field with sprayer 10. A product delivery pump can convey product from the product tank through plumbing components such as interconnected pieces of tubing and through a boom tubing system for release out of spray nozzles that are spaced from each other along the width of boom 26 during spraying operations of sprayer 10. Groups or banks of multiple adjacent spray nozzles define multiple spray sections of the spray system. Spray sections are defined along boom 26 and selectively deliver product for release onto an agricultural field at locations corresponding to positions of activated spray sections. Boom 26 is connected to chassis 12 with lift arm assembly 28 that is configured to move the boom 26 up and down for adjusting the height of application of the product.

The hydraulic system 20 may further include a hydraulic warm-up system 30 for use with various hydraulic circuits as will now be further described. The various hydraulic circuits are oftentimes cold when the sprayer 10 is originally powered on in the morning due to cold temperatures at night. In light of these cold temperatures, the hydraulic functions associated with the various hydraulic circuits are sluggish until the various hydraulic circuits are allowed to warm up. Traditionally, this occurs when the hydraulic functions associated with the various hydraulic circuits are actuated. Certain hydraulic components are especially prone to being sluggish until the component has been operated several times or until the oil temperature has been warmed up, including service brakes and implement hydraulic circuits.

The current hydraulic warm-up system 30 improves upon these systems by allowing the various hydraulic circuits to warm up prior to actuation of the hydraulic functions. In turn, this optimizes the efficiency of the various hydraulic circuits. To warm up the various hydraulic circuits, a quantity of oil, for instance, a parking brake oil, having a first temperature is routed through the various hydraulic circuits having a second temperature. The second temperature is typically the same as the outdoor temperature, which is oftentimes somewhat cold. As such, the first temperature is greater than the second temperature. As a result, as the oil is flushed through the various hydraulic circuits, the temperature of the various hydraulic circuits will raise above the second temperature.

The various hydraulic circuits may include a first hydraulic circuit 32 that is supplied with pressurized hydraulic oil. More specifically, the first hydraulic circuit 32 could be a parking brake circuit that is associated with a parking brake 34 used with the sprayer 10. As shown, the parking brake 34 may be spring-applied, such that it restrains the wheels 22 from spinning until a cylinder associated with the parking brake is pressurized. In such a system 30, the parking brake 34 is released using pressurized hydraulic oil provided by a hydraulic supply 36 having pressurized hydraulic oil including a parking brake oil defined by the volume(s) of oil from the hydraulic system that is delivered to the braking brake system. In one preferred embodiment, the hydraulic supply 36 may be a gear pump 38 that maintains a constant pressure while the pressurized hydraulic oil moves about the high clearance sprayer 10. In this instance, the first hydraulic circuit 32 may have oil, such as the parking brake oil, that reaches a certain temperature. However, despite having warm oil routed therethrough, the parking brake circuit typically has excess oil capacity when the sprayer 10 is in a parked position. This is due to the fact that the oil is not needed until the parking brake is released, which does not occur until the sprayer 10 warms up. As a result, any excess oil capacity can be routed to other sections of the various hydraulic circuits to flush these circuits and increase the temperature therein.

Figure 2:
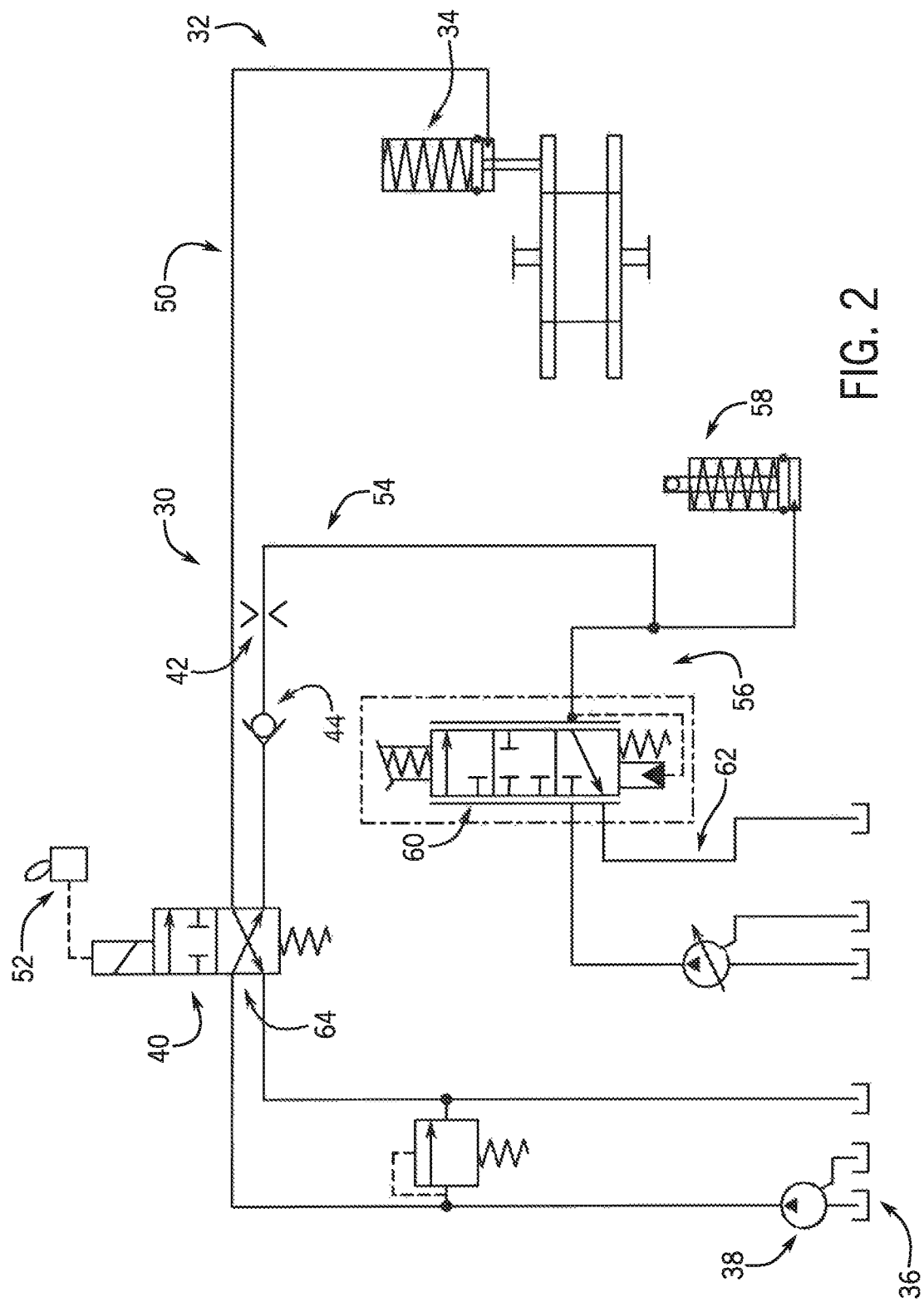
FIG. 2 is a simplified schematic representation of the hydraulic warm-up system associated with the agricultural machine of FIG. 1.

To achieve this goal, the warm-up system 30 may include a valve 40 associated with the first hydraulic circuit 32 or parking brake circuit, and the remaining various hydraulic circuits. The valve 40 may be a multiple-position, multi-way valve. As shown in FIG. 2, the valve 40 is a two-position, four-way valve. However, other types of valves could similarly be used to facilitate the flushing of oil while the unit is parked. In operation, the valve 40 can be moved between various positions to divert flow of oil. By way of example, the valve 40 may move between at least two positions. In the first position, the supply of oil, and more particularly parking brake oil, is routed through the parking brake circuit 32. While in the first position, the parking brake oil facilitates the release of the parking brake 34 as desired. This occurs when the sprayer 10 is mobile. In the second position, the supply of oil, and more particularly parking brake oil, is routed through a plurality of additional hydraulic circuits. Stated differently, in the second position, at least some of the parking brake oil is diverted away from the parking brake circuit 32. This occurs when the sprayer 10 is in a parked position, because the parking brake oil is not needed until the parking brake 34 needs to be released. Of course, other types of valves could similarly be used to control flow of oil about the various hydraulic circuits.

Additionally, the hydraulic warm-up system 10 may include at least one orifice 42 located in one of the circuits associated with the hydraulic system 20. The orifice 42 may serve to limit warn-up flow of the oil. The orifice 42 may also be used to ensure that a predetermined pressure is not exceeded. As such, a sensor (not shown) that is in communication with the orifice 42 may be used to monitor the pressure of the hydraulic system 20. In the event that the hydraulic circuit exceeds the predetermined pressure, the orifice 42 may relieve the pressure about the hydraulic system 20. This could prevent the activation of the any components associated with the hydraulic system 20, which would otherwise be activated due to the pressure caused by the oil.

Further still, the hydraulic warm-up system 10 may include a check valve 44 located in one of the circuits associated with the hydraulic system 20. The check valve 44 is configured to relieve pressure about the various circuits. For instance, certain sprayers feature parking brake circuits 32 having a different hydraulic pressure than other ancillary circuits 54. More specifically, sometimes the ancillary circuit 54 operates at a higher hydraulic pressure than the parking brake circuit 32. In such a hydraulic system 20, the parking brake circuit 32 needs to be protected from the higher pressure in the ancillary circuit because the pump 38 and valve 40 may not be rated to handle the higher pressure. The check valve 44 relieves such pressure.

As described above, the agricultural vehicle 10 may include the hydraulic system 20, a parking brake system, and the hydraulic warm-up system 30. More specifically, the parking brake system may include the parking brake 34, which has an activated state and a deactivated state. While in the activated state, the parking brake 34 prevents rotation of the wheels 22 of the agricultural vehicle 10. While in the deactivated state, the parking brake 34 allows for rotation of the wheels 22 of the agricultural device 10. The parking brake system may also include a parking brake supply pump, as shown, the gear pump 38, a parking brake valve, as shown valve 40, and at least one parking brake circuit hydraulic line 50. The at least one parking brake circuit hydraulic line 50 may fluidly connect the parking brake supply gear pump 38 for delivering hydraulic oil through the parking brake circuit hydraulic line 50. Additionally, the parking brake system may include a parking brake control device 52. The parking brake control device 52 may be movable between a first position to a second position. In the first position, the parking brake control device 52 is in a parking brake set position, wherein the parking brake 34 is activated. In the second position, the parking brake control device 52 is in a parking brake released position, wherein the parking brake 34 is deactivated. For instance, the parking brake control device 52 may be a rocker switch (not shown) that is pivotable between the first position and the second position.

The hydraulic system 20 may include multiple hydraulic circuits, as partially described above. For instance, the hydraulic system 20 may include the first hydraulic circuit 32, as shown the parking brake hydraulic circuit, as well as at least one ancillary hydraulic circuit 54. The first hydraulic circuit 32 directs flow of hydraulic oil through the parking brake system. This results in the activation and deactivation of the parking brake 34. The at least one ancillary hydraulic circuit 54 directs flow of hydraulic oil for correspondingly performing other ancillary functions of the agricultural vehicle 10. For instance, the ancillary hydraulic circuit 54 may operate with a service brake system 56 associated with a service brake 58 of the sprayer 10 and a service brake valve 60 that controls flow of oil about the service brake system 56. In this embodiment, the at least one parking brake circuit hydraulic line 50 and a hydraulic line 62 associated with the at least one ancillary hydraulic circuit 54 are connected to the parking brake valve 40. As such, at least some of the hydraulic oil flows from the at least one parking brake circuit hydraulic line 50 through the parking brake valve 40 and out of the at least one warm-up circuit hydraulic line 62. The oil is therefore delivered through the ancillary hydraulic circuit 54 to warm the service brake system 56. By warming up the ancillary hydraulic circuit 54, use of the service brake 58 can be optimized. The oil could similarly be delivered to a foot brake system (not shown) including a foot brake (not shown).

The hydraulic warm-up system 30 may include a warm-up circuit 64 as described above. This warm-up circuit 64 may be defined by at least part of the parking brake hydraulic circuit line 32 and the at least one ancillary hydraulic circuit 54. Thus, some of the hydraulic oil that flows through the parking brake hydraulic circuit 32 flows through the at least one ancillary hydraulic circuit 54 when the parking brake is activated. This results in the warming of at the at least one ancillary hydraulic circuit 54. In one embodiment, the warm-up circuit 64 diverts some of the hydraulic oil flow from the parking brake hydraulic circuit 32 through the warm-up circuit hydraulic line 62 for delivery through the at least one ancillary hydraulic circuit 54.

While the hydraulic warm-up system 30 described above uses oil associated with the parking brake 34 and associated parking brake hydraulic circuit 50 to warm other hydraulic circuits, it should be noted that oil associated with any other component or hydraulic circuit could similarly be used to warm other hydraulic circuits. This in turn improves operation of the various hydraulic circuits of the sprayer 10. Of course, the hydraulic warm-up system 30 could also feature any number of additional common components of a hydraulic system, including various pumps, valves, and the like.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

I claim:

1. A hydraulic warm-up system for use with a high clearance sprayer comprising:
   a parking brake;
   a first hydraulic circuit associated with the parking brake;
   a hydraulic supply with pressurized hydraulic oil including a parking brake oil;
   a plurality of additional hydraulic circuits; and
   a valve associated with the first hydraulic circuit and the plurality of additional hydraulic circuits;
   wherein:
   the valve is movable between:
      a first position wherein the supply of parking brake oil is routed through the first hydraulic circuit to release the parking brake when the high clearance sprayer is mobile; and
      a second position wherein the supply of parking brake oil is routed through the plurality of hydraulic circuits when the high clearance sprayer is parked; and
   the parking brake oil is diverted away from the first hydraulic circuit when the high clearance sprayer is parked.

2. A hydraulic warm-up system for use with a high clearance sprayer comprising:
   a parking brake;
   a first hydraulic circuit associated with the parking brake;
   a hydraulic supply with pressurized hydraulic oil including a parking brake oil;
   a plurality of additional hydraulic circuits; and
   a valve associated with the first hydraulic circuit and the plurality of additional hydraulic circuits;
   wherein:
   the valve is movable between:
      a first position wherein the supply of parking brake oil is routed through the first hydraulic circuit to release the parking brake when the high clearance sprayer is mobile; and
      a second position wherein the supply of parking brake oil is routed through the plurality of hydraulic circuits when the high clearance sprayer is parked;
   the supply of pressurized hydraulic oil is initially at a first temperature;
   the plurality of additional hydraulic circuits is initially at a second temperature;
   the first temperature is higher than the second temperature; and
   the pressurized hydraulic oil is routed through the plurality of additional hydraulic circuits to raise the temperature of the plurality of additional hydraulic circuits.

3. A hydraulic warm-up system for use with a high clearance sprayer comprising:
   a parking brake;
   a first hydraulic circuit associated with the parking brake;
   a hydraulic supply with pressurized hydraulic oil including a parking brake oil;
   a plurality of additional hydraulic circuits; and
   a valve associated with the first hydraulic circuit and the plurality of additional hydraulic circuits;
   wherein:
   the valve is movable between:
      a first position wherein the supply of parking brake oil is routed through the first hydraulic circuit to release the parking brake when the high clearance sprayer is mobile; and
      a second position wherein the supply of parking brake oil is routed through the plurality of hydraulic circuits when the high clearance sprayer is parked; and
   the plurality of additional hydraulic circuits is supplied with oil when a component associated with the additional hydraulic circuits is actuated.

4. A hydraulic warm-up system for use with a high clearance sprayer comprising:
   a parking brake;
   a first hydraulic circuit associated with the parking brake;
   a hydraulic supply with pressurized hydraulic oil including a parking brake oil;
   a plurality of additional hydraulic circuits;
   a valve associated with the first hydraulic circuit and the plurality of additional hydraulic circuits; and
   a service brake;
   wherein:
   the valve is movable between:
      a first position wherein the supply of parking brake oil is routed through the first hydraulic circuit to release the parking brake when the high clearance sprayer is mobile; and
      a second position wherein the supply of parking brake oil is routed through the plurality of hydraulic circuits when the high clearance sprayer is parked;
   the plurality of additional hydraulic circuits includes a second hydraulic circuit associated with the service brake; and the parking brake oil is routed through the second hydraulic circuit when the high clearance sprayer is parked.

5. A hydraulic warm-up system for use with a high clearance sprayer comprising:
a parking brake;
a first hydraulic circuit associated with the parking brake;
a hydraulic supply with pressurized hydraulic oil including a parking brake oil;
a plurality of additional hydraulic circuits;
a valve associated with the first hydraulic circuit and the plurality of additional hydraulic circuits; and
an orifice configured to limit warm-up flow and to relieve pressure about the plurality of additional hydraulic circuits to prevent activation of a component associated with the additional hydraulic circuits;
wherein:
the valve is movable between:
a first position wherein the supply of parking brake oil is routed through the first hydraulic circuit to release the parking brake when the high clearance sprayer is mobile; and
a second position wherein the supply of parking brake oil is routed through the plurality of hydraulic circuits when the high clearance sprayer is parked.

6. An off-road agricultural vehicle with a multiple hydraulic circuits for performing multiple machine functions and a hydraulic warm-up system, the off-road agricultural vehicle comprising:
a parking brake system including,
a parking brake that defines an activated state to prevent rotation of wheels of the off-road agricultural vehicle and a deactivated stated to allow rotation of the wheels of the off-road agricultural vehicle;
a hydraulic system with multiple hydraulic circuits including,
a parking brake hydraulic circuit that directs flow of hydraulic oil through the parking brake system to control activating and deactivating the parking brake; and
at least one ancillary hydraulic circuit that directs flow of hydraulic oil for correspondingly performing at least one ancillary function of the off-road agricultural vehicle;
a hydraulic warm-up system including,
a warm-up circuit defined by at least part of the parking brake hydraulic circuit and the at least one ancillary hydraulic circuit so that at least some of the hydraulic oil that flows through the parking brake hydraulic circuit flows through the at least one ancillary hydraulic circuit when the parking brake is activated for warming the at least one ancillary hydraulic circuit.

7. The off-road agricultural vehicle of claim 6, wherein the parking brake hydraulic circuit includes,
a parking brake supply pump;
a parking brake valve; and
a least one parking brake circuit hydraulic line that fluidly connects the parking brake supply pump for delivering hydraulic oil through the parking brake hydraulic circuit; and
the warm-up circuit includes,
a least one warm-up circuit hydraulic line that fluidly connects the parking brake hydraulic circuit to the warm-up circuit; and
wherein when the parking brake is activated, at least some of the hydraulic oil flows out of the parking brake hydraulic circuit and through the warm-up circuit hydraulic line for delivery through the at least one ancillary hydraulic circuit.

8. The off-road agricultural vehicle of claim 7, wherein the at least one ancillary hydraulic circuit is defined within a service brake system of the off-road agricultural vehicle, and
wherein each of the at least one parking brake circuit hydraulic line and the at least one warm-up circuit hydraulic line is connected to the parking brake valve so that at least some of the hydraulic oil flows from the at least one parking brake circuit hydraulic line, through the parking brake valve, and out of the at least one warm-up circuit hydraulic line for delivery through the service brake system to warm the service brake system.

9. The off-road agricultural vehicle of claim 8, wherein the parking brake valve is a multi-position multi-way valve.

10. The off-road agricultural vehicle of claim 9, wherein the parking brake valve is a 2-position 4-way valve.

11. The off-road agricultural vehicle of claim 10, further comprising a parking brake control device that is movable between a first position as a parking brake set position to activate the parking brake and a second position as a parking brake released position to deactivate the parking brake.

12. The off-road agricultural vehicle of claim 11, wherein the parking brake control device is defined by a rocker switch pivotable between the parking brake set position and the parking brake released position.

13. A hydraulic warm-up system for use with an off-road agricultural vehicle, the hydraulic warm-up system comprising:
a parking brake hydraulic circuit that continuously directs a flow of a hydraulic oil through a parking brake system to maintain a parking brake in an activated state to prevent rotation of wheels of the off-road agricultural vehicle when the parking brake is set, wherein the parking brake hydraulic circuit includes,
a parking brake supply pump;
a parking brake valve; and
a parking brake circuit hydraulic line that fluidly connects the parking brake supply pump for delivering hydraulic oil through the parking brake hydraulic circuit; and
an ancillary hydraulic circuit that directs flow of hydraulic oil for performing an ancillary function of the off-road agricultural vehicle; and
a warm-up circuit that includes,
a warm-up circuit hydraulic line that fluidly connects the parking brake valve to the ancillary hydraulic circuit and wherein at least some of the hydraulic oil that flows through the parking brake hydraulic circuit is directed through and warms the ancillary hydraulic circuit.

* * * * *